United States Patent
Ewing et al.

(10) Patent No.: US 9,489,755 B2
(45) Date of Patent: Nov. 8, 2016

(54) DETERMINING RESERVE ESTIMATES FOR A RESERVOIR

(71) Applicant: Landmark Graphics Corporation, Houston, TX (US)

(72) Inventors: Michael David Ewing, Castle Rock, CO (US); Catalina Maria Luneburg, Golden, CO (US); David Bryan Johanson, Lakewood, CO (US); Sammi Igarashi, Lakewood, CO (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 14/431,761

(22) PCT Filed: Aug. 15, 2014

(86) PCT No.: PCT/US2014/051314
§ 371 (c)(1),
(2) Date: Mar. 26, 2015

(87) PCT Pub. No.: WO2015/023964
PCT Pub. Date: Feb. 19, 2015

(65) Prior Publication Data
US 2015/0240624 A1    Aug. 27, 2015

Related U.S. Application Data

(60) Provisional application No. 61/866,901, filed on Aug. 16, 2013.

(51) Int. Cl.
| | | |
|---|---|---|
| G06G 7/48 | (2006.01) | |
| G06T 11/20 | (2006.01) | |
| G06T 17/05 | (2011.01) | |
| G06T 17/20 | (2006.01) | |
| E21B 47/04 | (2012.01) | |
| E21B 49/08 | (2006.01) | |
| G01V 99/00 | (2009.01) | |

(Continued)

(52) U.S. Cl.
CPC ............. *G06T 11/203* (2013.01); *E21B 47/04* (2013.01); *E21B 49/08* (2013.01); *G01V 99/005* (2013.01); *G06T 11/206* (2013.01); *G06T 11/60* (2013.01); *G06T 17/05* (2013.01); *G06T 17/10* (2013.01); *G06T 17/20* (2013.01)

(58) Field of Classification Search
CPC .............................. G06G 7/48; G01V 99/005
USPC .......................................................... 703/10
See application file for complete search history.

(56) References Cited

U.S. PATENT DOCUMENTS

| | | |
|---|---|---|
| 6,101,447 A | 8/2000 | Poe, Jr. |
| 2004/0158406 A1 | 8/2004 | Harrison |

(Continued)

OTHER PUBLICATIONS

Commissioner; International Search Report and the Written Opinion of the International Searching Authority; PCT/US14/51314; Nov. 25, 2014; 14 pgs.; ISA/KR.

(Continued)

*Primary Examiner* — Hugh Jones
(74) *Attorney, Agent, or Firm* — Crain, Caton & James; Tenley Krueger

(57) ABSTRACT

Systems and methods for determining reserve estimates for a reservoir using a thickness grid multiplied by one or more grids of laterally-varying attributes to produce a unified grid from which the reserve estimates are determined.

20 Claims, 9 Drawing Sheets

(51) Int. Cl.
*G06T 17/10* (2006.01)
*G06T 11/60* (2006.01)

(56) References Cited

U.S. PATENT DOCUMENTS

| | | |
|---|---|---|
| 2005/0119911 A1 | 6/2005 | Ayan et al. |
| 2007/0061117 A1 | 3/2007 | Landis et al. |
| 2008/0249906 A1 | 10/2008 | Landis, Jr. et al. |
| 2011/0191029 A1 | 8/2011 | Jalali et al. |

OTHER PUBLICATIONS

Yukari Nakamura; International Preliminary Report on Patentability; PCT/US14/51314; Feb. 25, 2016; 8 pgs.; WIPO.

Craft, et al.; Applied Petroleum Reservoir Engineering; 1959; 10 pgs; Prentice-Hall, Inc.; Englewood Cliffs, NJ.

Schlumberger; Petrel Surface Volumetrics, Petrel Geology & Modeling; Apr. 13, 2016; 4 pgs.

LMKR; GeoGraphix Volumetrics; Apr. 13, 2016; 3 pgs.

RockWare; RockWorks Volumetrics; Apr. 13, 2016; 4 pgs.

Nauralog; NeuraMap, Reservoir Volumetrics and Map Digitizing; Apr. 13, 2016; 2 pgs.

Charles Berko; Patent Examination Report No. 1 for Australian Patent Application No. 2014306493; Feb. 1, 2016; 5 pgs.; Australian Patent Office.

Martin Richardson; Response to Patent Examination Report No. 1 for Australian Patent Application No. 2014306493; Feb. 15, 2016; 9 pgs.; Pizzeys.

| Calculation Name ▽ | Calculation, T... | Date | Interpreter | Volume | Unit |
|---|---|---|---|---|---|
| ⊟ Min Contact | GRVCalc | 5/15/13 9:30 AM | 01STA | 1.2035E10 | ft3 |
| ⊟ OOIP | OOIPCalc | 5/15/13 9:31 AM | 01STA | 2.1435E6 | bbl |
| ⊟ STOOIP | STOOIPCalc | 5/15/13 9:31AM | 01STA | 5.3587E6 | bbl |
| RHCR | RHCRCalc | 5/15/13 9:31 AM | 01STA | 2.1435E6 | bbl |
| ⊟ Max Contact | GRVCalc | 5/14/13 4:08 PM | 01STA | 3.4079E8 | m3 |
| ⊟ OOIP | OOIPCalc | 5/14/13 4:25 PM | 01STA | 1.2004E8 | bbl |
| ⊟ STOOIP | STOOIPCalc | 5/14/13 4:25 PM | 01STA | 7.0609E7 | bbl |
| 0.4 R | RHCRCalc | 5/14/13 4:25 PM | 01STA | 2.8244E7 | bbl |
| 0.2 R | RHCRCalc | 5/15/13 9:21 AM | 01STA | 1.4122E7 | bbl |
| ⊟ OOIP | OOIPCalc | 5/15/13 9:30 AM | 01STA | 6.8158E5 | m3 |
| ⊟ STOOIP | STOOIPCalc | 5/15/13 9:30 AM | 01STA | 4.8684E5 | bbl |
| RHCR | RHCRCalc | 5/15/13 9:30 AM | 01STA | 2.4342E5 | m3 |
| ⊟ Min | OOIPCalc | 5/15/13 9:27 AM | 01STA | 2.1435E6 | bbl |
| ⊟ Low | STOOIPCalc | 5/15/13 9:27 AM | 01STA | 4.287E6 | bbl |
| 0.7 R | RHCRCalc | 5/15/13 9:29 AM | 01STA | 3.0009E6 | bbl |
| 0.2 R | RHCRCalc | 5/15/13 9:27 AM | 01STA | 8.574E5 | bbl |
| ⊟ High | STOOIPCalc | 5/15/13 9:28 AM | 01STA | 1.2609E6 | bbl |
| 0.8 R | RHCRCalc | 5/15/13 9:28 AM | 01STA | 1.0087E6 | bbl |
| 0.3 R | RHCRCalc | 5/15/13 9:28 AM | 01STA | 3.7826E5 | bbl |

FIG. 8

| Calculation Name | Compartment GRV | Net to Gross | Porosity | HC Saturation | OOIP | Form Vol Factor | STOOIP | Recovery Factor | RHCR | Date |
|---|---|---|---|---|---|---|---|---|---|---|
| Max Contact | 3.4079E8 m3 | | | | | | | | | 2013-0 16:08: |
| OOIR | 3.4079E8 m3 | 0.10 | 0.10 | 0.20 | 6.8158E5 m3 | | | | | 2013-0 09:30: |
| STOOIP | 3.4079E8 m3 | 0.10 | 0.10 | 0.20 | 6.8158E5 m3 | 1.40 | 4.8684E5 m3 | | | 2013-0 09:30: |
| RHCR | 3.4079E8 m3 | 0.10 | 0.10 | 0.20 | 6.8158E5 m3 | 1.40 | 4.8684E5 m3 | 0.50 | 2.4342E5 m3 | 2013-0 09:30: |
| Min | 3.4079E8 m3 | 0.10 | 0.10 | 0.10 | 2.1435E6 bbl | | | | | 2013-0 09:27: |
| Low | 3.4079E8 m3 | 0.10 | 0.10 | 0.10 | 2.1435E6 bbl | 0.50 | 4.287E6 bbl | | | 2013-0 09:27: |
| 0.7 R | 3.4079E8 m3 | 0.10 | 0.10 | 0.10 | 2.1435E6 bbl | 0.50 | 4.287E6 bbl | 0.70 | 3.0009E6 bbl | 2013-0 09:27: |
| 0.2 R | 3.4079E8 m3 | 0.10 | 0.10 | 0.10 | 2.1435E6 bbl | 0.50 | 4.287E6 bbl | 0.20 | 8.574E5 bbl | 2013-0 09:27: |
| High | 3.4079E8 m3 | 0.10 | 0.10 | 0.10 | 2.1435E6 bbl | 1.70 | 1.2609E6 bbl | | | 2013-0 09:27: |
| 0.8 R | 3.4079E8 m3 | 0.10 | 0.10 | 0.10 | 2.1435E6 bbl | 1.70 | 1.2609E6 bbl | 0.80 | 1.0007E6 bbl | 2013-0 09:27: |

FIG. 9

DETERMINING RESERVE ESTIMATES FOR A RESERVOIR

CROSS-REFERENCE TO RELATED APPLICATIONS

This Application claims priority from PCT patent application Ser. No. PCT/US14/51314, filed Aug. 15, 2014, which claims priority from U.S. Provisional Patent Application Ser. No. 61/866,901, filed Aug. 16, 2013, which are incorporated herein by reference. This application and U.S. patent application Ser. Nos. 14/431,758, 14/431,763, and 14/431,766, which are incorporated herein by reference, are commonly assigned to Landmark Graphics Corporation.

STATEMENT REGARDING FEDERALLY SPONSORED RESEARCH

Not applicable.

FIELD OF THE DISCLOSURE

The present disclosure generally relates to systems and methods for determining reserve estimates for a reservoir. More particularly, the present disclosure relates to determining reserve estimates for a reservoir using a thickness grid multiplied by one or more grids of laterally-varying attributes to produce a unified grid from which the reserve estimates are determined.

BACKGROUND

Accurate reserve estimates are critical in the industry for proper risk assessment and providing these in a structural framework setting is unique. Traditional volumetric calculations are purely grid-based and define the volume between surfaces/horizons by computing and summarizing horizontal slices. The slicing technique does not accurately define geologic volumes especially with complex geometries such as fault blocks or salt bodies. In addition, it is challenging for the user to gain an accurate three-dimensional visual representation of the calculated volumes. Geocellular-based volume calculations also inadequately define volumes due to stair-stepped geometry representations.

BRIEF DESCRIPTION OF THE DRAWINGS

The present disclosure is described below with references to the accompanying drawings in which like elements are referenced with like reference numerals, and in which:

FIG. 8 is a display illustrating an exemplary tree table created in step 604 of FIG. 6.

FIG. 9 is a display illustrating an exemplary HTML report created with a default XSL in step 614 of FIG. 6.

DETAILED DESCRIPTION OF THE PREFERRED EMBODIMENTS

Figure 1:
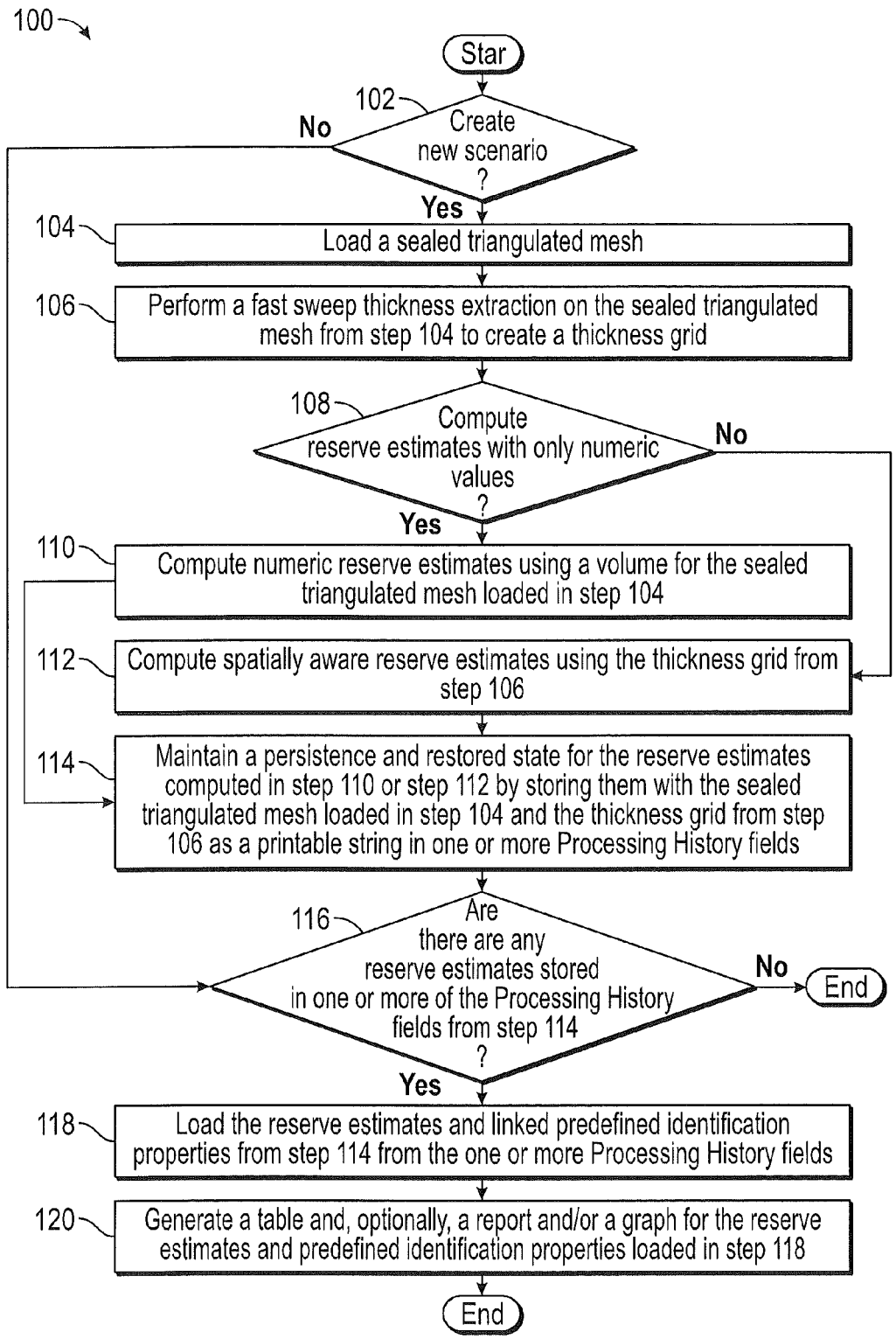
FIG. 1 is a flow diagram illustrating one embodiment of a method 100 for implementing the present disclosure.

The present disclosure overcomes one or more deficiencies in the prior art by providing systems and methods for determining reserve estimates for a reservoir using a thickness grid multiplied by one or more grids of laterally-varying attributes to produce a unified grid from which the reserve estimates are determined.

In one embodiment, the present disclosure includes a method for determining reserve estimates for a reservoir, which comprises: i) resampling an attribute grid by matching the attribute grid and a thickness grid so that the attribute grid includes an attribute grid node at each location of a thickness grid node; ii) creating a unified grid with a plurality of cells and a unified grid node at each location of an attribute grid node; wherein each unified grid node includes a value that is the product of a thickness value of a thickness grid node at a location of the respective unified grid node and an attribute value of a respective resampled attribute grid node at the location of the respective unified grid node; iii) replacing each invalid value for a respective unified grid node with one of a constant value and an average value; iv) dividing each cell of the unified grid into four triangles, wherein each of the four triangles includes a vertex at a center of the respective cell and two vertices that form one of four sides of the respective cell; v) creating a truncated prism with a volume for each set of four triangles using a computer processor; vi) adding the volume of each truncated prism together, which represents an Original Oil in Place; vii) dividing the Original Oil in Place by a Formation Volume Factor, which represents a Stock Tank Original Oil in Place; and viii) multiplying the Stock Tank Original Oil in Place and a recovery factor, which represents Recoverable Hydrocarbon Reserves.

In another embodiment the present disclosure includes a non-transitory program carrier device tangibly carrying computer-executable instructions for creating a thickness grid for determining reserve estimates for a reservoir, the instructions being executable to implement: i) resampling an attribute grid by matching the attribute grid and a thickness grid so that the attribute grid includes an attribute grid node at each location of a thickness grid node; ii) creating a unified grid with a plurality of cells and a unified grid node at each location of an attribute grid node; wherein each unified grid node includes a value that is the product of a thickness value of a thickness grid node at a location of the respective unified grid node and an attribute value of a respective resampled attribute grid node at the location of the respective unified grid node; iii) replacing each invalid value for a respective unified grid node with one of a constant value and an average value; iv) dividing each cell of the unified grid into four triangles, wherein each of the four triangles includes a vertex at a center of the respective cell and two vertices that form one of four sides of the respective cell; v) creating a truncated prism with a volume for each set of four triangles; vi) adding the volume of each truncated prism together, which represents an Original Oil in Place; vii) dividing the Original Oil in Place by a Formation Volume Factor, which represents a Stock Tank Original Oil in Place; and viii) multiplying the Stock Tank Original Oil in Place and a recovery factor, which represents Recoverable Hydrocarbon Reserves.

In yet another embodiment, the present disclosure includes a non-transitory program carrier device tangibly carrying computer-executable instructions for determining reserve estimates for a reservoir, the instructions being executable to implement: i) resampling an attribute grid by matching the attribute grid and a thickness grid so that the attribute grid includes an attribute grid node at each location of a thickness grid node; ii) creating a unified grid with a plurality of cells and a unified grid node at each location of an attribute grid node; wherein each unified grid node includes a value that is the product of a thickness value of a thickness grid node at a location of the respective unified grid node and an attribute value of a respective resampled attribute grid node at the location of the respective unified grid node; iii) replacing each invalid value for a respective unified grid node; iv) dividing each cell of the unified grid into four triangles, wherein each of the four triangles includes a vertex at a center of the respective cell and two vertices that form one of four sides of the respective cell; v) creating a truncated prism with a volume for each set of four triangles by connecting each vertex for a respective triangle to a plane including only an x-value and a y-value of the respective vertex at z=0; vi) adding the volume of each truncated prism together, which represents an Original Oil in Place; vii) dividing the Original Oil in Place by a Formation Volume Factor, which represents a Stock Tank Original Oil in Place; and viii) multiplying the Stock Tank Original Oil in Place and a recovery factor, which represents Recoverable Hydrocarbon Reserves.

The subject matter of the present disclosure is described with specificity; however, the description itself is not intended to limit the scope of the disclosure. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present disclosure may be applied in the oil and gas industry, it is not limited thereto and may also be applied in other industries to achieve similar results.

Method Description

The present disclosure describes various approaches for computing gross rock volumes (GRV) and reserves while running multiple scenarios, keeping track of the calculation history and even restoring former volumes visually for time-lapse analyses. The present disclosure further offers a unique workflow for performing highly accurate GRV and reserve calculations in a dynamic structural framework setting.

This disclosure complements a new direction in 3D modeling where sealed triangulated mesh spaces, also referred to as called compartments, are modeled instead of just the geological objects (e.g. surfaces, faults, geoshells, fluid contacts). These compartments are auto-grouped into different geologic categories such as stratigraphic layers, fault blocks, fluid layers and geoshells, or they may be grouped manually into custom reservoirs, to help identify the exact GRV and/or reserve calculations. The modeled volumes may be visualized in all views by color and/or lithology fills.

This disclosure thus, provides a number of techniques that work by combining closed triangulated mesh compartments. The volumes of all the individual triangulated mesh bodies comprising compartments are obtained through a direct polyhedral volume calculation and are added together to produce a GRV for the interior space of each compartment. This value can then be used in numerical reserve estimates or in a new feature that uses extracted thickness values to perform grid-based reserve estimates.

At all stages of the analysis, the actual sealed space being analyzed is visible. A subset of the sealed model is isolated and preserved for both analysis and later viewing, making it easy to visualize what was computed and how it changes through time. All thickness and reserve calculations can also be viewed as 3D grids and used to generate varying scenarios both visually and numerically at any stage in the reserve estimation process.

Referring now to FIG. 1, a flow diagram of one embodiment of a method 100 for implementing the present disclosure is illustrated.

Figure 10:
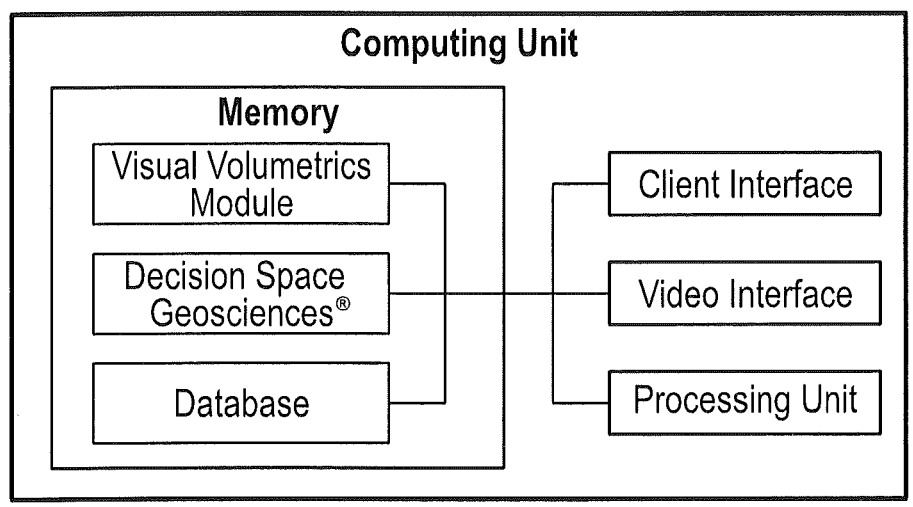
FIG. 10 is a block diagram illustrating one embodiment of a computer system for implementing the present disclosure.

In step 102, the method 100 determines if a new scenario should be created using the client interface and/or the video interface described in reference to FIG. 10. If a new scenario should not be created, then the method 100 proceeds to step 116. Otherwise, the method 100 proceeds to step 104.

In step 104, a sealed triangulated mesh is loaded. The sealed triangulated mesh includes a volume that is computed in the unit system of any well-known 3D modeling engine using techniques well known in the art such as Stoke's Theorem.

In step 106, fast sweep thickness extraction is performed on the sealed triangulated mesh from step 104 to create a thickness grid. One embodiment of a method for performing this step is described further in reference to FIG. 2.

In step 108, the method 100 determines if reserve estimates should be computed with only numeric values using the client interface and/or the video interface described in reference to FIG. 10. If reserve calculations should not be computed with only numeric values, then the method 100 proceeds to step 112. Otherwise, the method 100 proceeds to step 110.

In step 110, numeric reserve estimates are computed using the volume for the sealed triangulated mesh loaded in step 104 and the method 100 proceeds to step 114. One embodiment of a method for performing this step is described further in reference to FIG. 3.

In step 112, spatially aware reserve estimates are computed using the thickness grid from step 106. One embodiment of a method for performing this step is described further in reference to FIG. 4.

In step 114, a persistence and restored state are maintained for the reserve estimates computed in step 110 or step 112 by storing them with the sealed triangulated mesh loaded in step 104 and the thickness grid from step 106 as a printable string in one or more Processing History fields. One embodiment of a method for performing this step is described further in reference to FIG. 5.

In step 116, the method 100 determines if there are any reserve estimates stored in one or more of the Processing History fields from step 114. If there are no reserve estimates stored in the one or more Processing History fields, then the method 100 ends. Otherwise, the method 100 proceeds to step 118.

In step 118, the reserve estimates and linked predefined identification properties from step 114 are loaded from the one or more Processing History fields.

In step 120, a table and, optionally, a report and/or a graph are generated for the reserve estimates and predefined identification properties loaded in step 118. One embodiment of a method for performing this step is described further in reference to FIG. 6.

Fast Sweep Thickness Extraction

Figure 2:
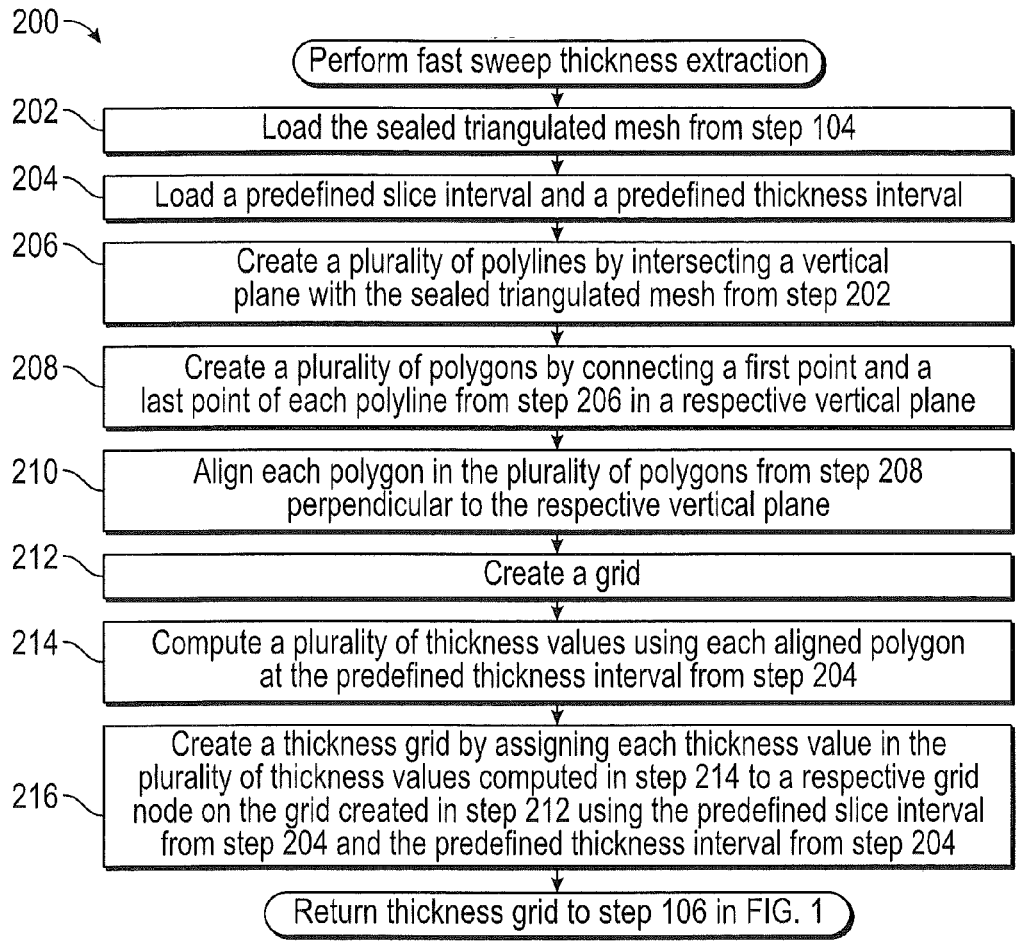
FIG. 2 is a flow diagram illustrating one embodiment of a method 200 for implementing step 106 in FIG. 1.

Referring now to FIG. 2, a flow diagram illustrating one embodiment of a method 200 for implementing step 106 in FIG. 1 is illustrated. The method 200 performs a fast sweep thickness extraction on the sealed triangulated mesh from step 104 to create a thickness grid. The thickness grid may be multiplied by a constant value or by one or more other grids with laterally-varying attributes to produce reserve estimates.

In step 202, the sealed triangulated mesh from step 104 is loaded.

In step 204, a predefined slice interval and a predefined thickness interval are loaded.

In step 206, a plurality of polylines is created by intersecting a vertical plane with the sealed triangulated mesh from step 202 at the predefined slice interval from step 204 along an x-dimension in spatial extents for the sealed triangulated mesh using contouring techniques that are well known in the art. Each polyline includes a first point and a last point.

In step 208, a plurality of polygons is created by connecting the first point and the last point of each polyline in a respective vertical plane. Each polygon in the plurality of polygons lies in a respective vertical plane defined by the intersection of the vertical plane with the sealed triangulated mesh at the predefined slice interval.

In step 210, each polygon in the plurality of polygons from step 208 is aligned perpendicular to the respective vertical plane.

In step 212, a grid is created having an equal number of rows and columns, spatial extents that match the spatial extents of the sealed triangulated mesh from step 202, a grid x-dimension cell size equal to the predefined slice interval from step 204 and a grid y-dimension cell size equal to the predefined thickness interval from step 204. Each grid node is initialized with a value of zero. The grid, for example, may have 1000 rows and 1000 columns for computing efficiency and broad application coverage. The grid is preferably positioned above the sealed triangulate mesh from step 202.

In step 214, a plurality of thickness values are computed using techniques well-known in the art and each aligned polygon at the predefined thickness interval from step 204.

In step 216, a thickness grid is created by assigning each thickness value in the plurality of thickness values computed in step 214 to a respective grid node on the grid created in step 212 using the predefined slice interval from step 204 and the predefined thickness interval from step 204. The predefined slice interval and the predefined thickness interval are used to assign each thickness value to a respective grid node by assigning each thickness value corresponding to a respective vertical plane at the predefined slice interval and predefined thickness interval to a respective grid node on the grid at an x-dimension corresponding to the respective vertical plane at the predefined slice interval and at a y-dimension corresponding to the predefined thickness interval. The thickness grid is returned to step 106 in FIG. 1.

Numeric Reserve Estimates

Figure 3:
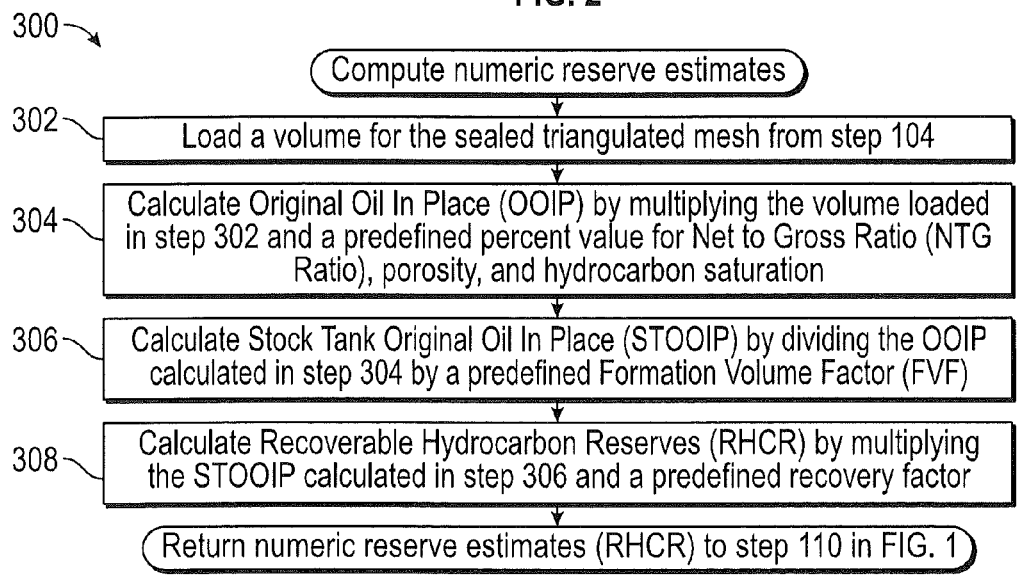
FIG. 3 is a flow diagram illustrating one embodiment of a method 300 for implementing step 110 in FIG. 1.

Referring now to FIG. 3, a flow diagram of one embodiment of a method 300 for implementing step 110 in FIG. 1 is illustrated. The method 300 computes numeric reserve estimates using the volume for the sealed triangulated mesh loaded in step 104.

In step 302, the volume for the sealed triangulated mesh from step 104 is loaded.

In step 304, Original Oil In Place (OOIP) is calculated by multiplying the volume loaded in step 302 and a predefined percent value for Net to Gross Ratio (NTG Ratio), porosity, and hydrocarbon saturation.

In step 306, Stock Tank Original Oil In Place (STOOIP) is calculated by dividing the OOIP calculated in step 304 by a predefined Formation Volume Factor (FVF).

In step 308, Recoverable Hydrocarbon Reserves (RHCR) is calculated by multiplying the STOOIP calculated in step 306 and a predefined recovery factor. The numeric reserve estimates (RHCR) are returned to step 110 in FIG. 1.

Spatially Aware Reserve Estimates

Figure 4:
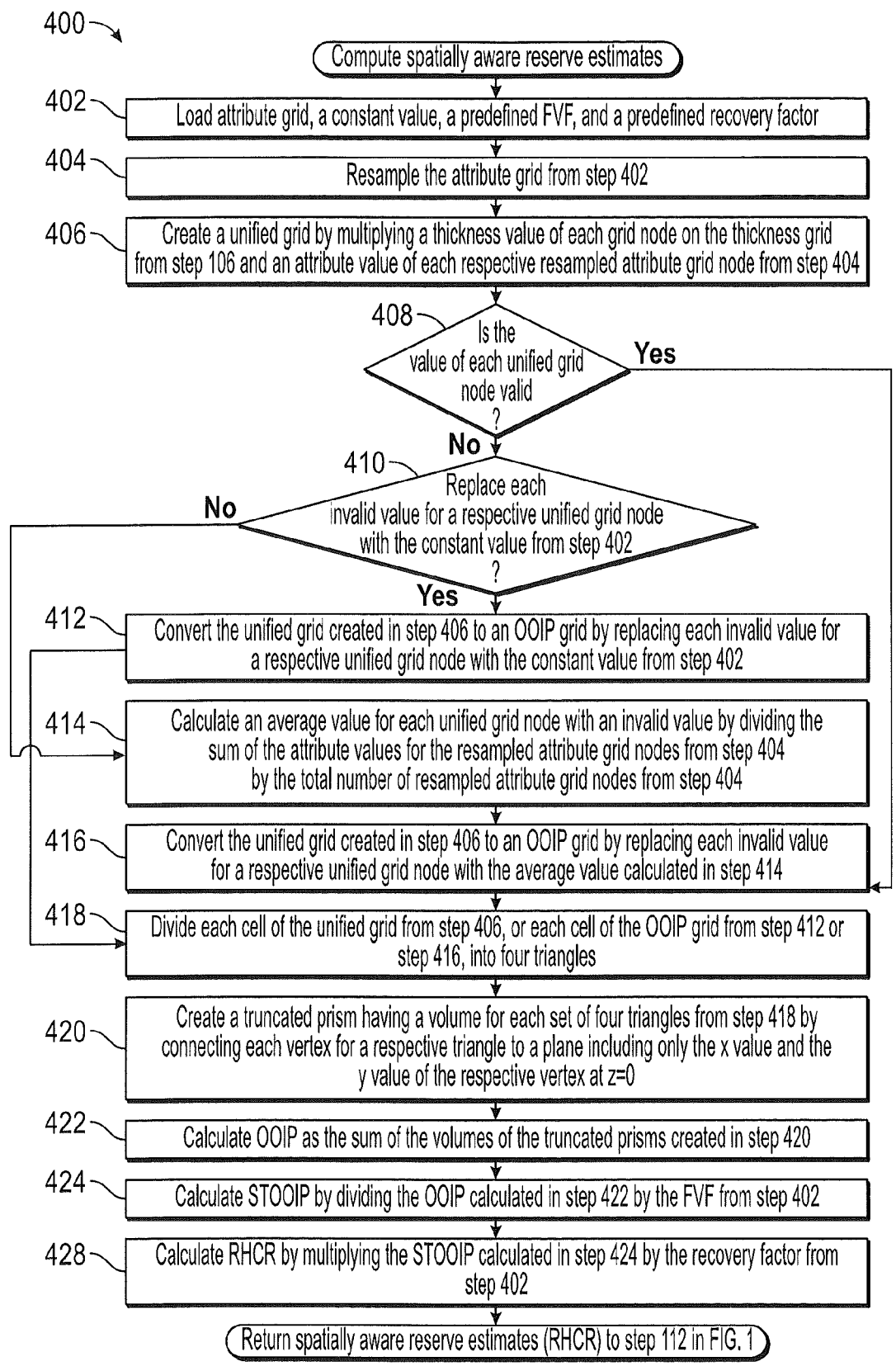
FIG. 4 is a flow diagram illustrating one embodiment of a method 400 for implementing step 112 in FIG. 1.

Referring now to FIG. 4, a flow diagram of one embodiment of a method 400 for implementing step 112 in FIG. 1 is illustrated. The method 400 computes spatially aware reserve estimates using the thickness grid from step 106. A defining feature of the method 400 is the ability to match the thickness grid and an attribute grid. The thickness grid represents the aggregate vertical thickness of a compartment at each grid node. The method 400 enables the thickness grid to be multiplied by one or more grids of laterally-varying attributes to produce a unified grid. Gross volumes may then be derived from gross thickness grids and net volumes may be acquired from the unified grids.

In step 402, an attribute grid, a constant value, a predefined FVF, and a predefined recovery factor are loaded. The attribute grid includes an attribute grid node at each intersection of the attribute grid representing a plurality of attribute grid nodes, wherein each attribute grid node has an attribute value. The attribute grid thus, may represent attributes such as porosity, permeability, fluid saturation and NTG, for example.

In step 404, the attribute grid from step 402 is resampled using resampling techniques well known in the art such as bicubic interpolation to match the attribute grid and the thickness grid from step 106 so that the attribute grid includes an attribute grid node at each location of a thickness grid node. As a result, some of the attribute grid nodes may have an attribute value that is null when the attribute grid and the thickness grid are not the same size.

In step 406, a unified grid is created by multiplying the thickness value of each grid node on the thickness grid from step 106 and the attribute value of each respective resampled attribute grid node from step 404. The unified grid thus, includes a unified grid node at each location of an attribute grid node representing a plurality of unified grid nodes, wherein each unified grid node has a value that is the product of the thickness value of a thickness grid node at the same location and the attribute value of a respective resampled attribute grid node at the same location. The value of a unified grid node is invalid if the thickness value of a thickness grid node is at the same location is multiplied by a null attribute value of a respective resampled attribute grid node at the same location. The unified grid also defines a plurality of cells, wherein each cell includes four sides and a center.

In step 408, the method 400 determines if the value of each unified grid node is valid. If the value of each unified grid node is valid, then the method proceeds to step 418. Otherwise, the method proceeds to step 410.

In step 410, the method 400 determines whether to replace each invalid value for a respective unified grid node with the constant value from step 402 using the client interface and/or the video interface described in reference to FIG. 10. If each invalid value for a respective unified grid node should not be replaced with the constant value, then the method 400 proceeds to step 414. Otherwise, then the method 400 proceeds to step 412.

In step 412, the unified grid created in step 406 is converted to an OOIP grid by replacing each invalid value for a respective unified grid node with the constant value from step 402. The OOIP grid thus, includes an OOIP grid node at each location of a respective unified grid node representing a plurality of OOIP grid nodes, wherein each OOIP grid node has a value that is the same value as the valid value of the respective unified grid node or the constant value. The OOIP grid defines a plurality of cells, wherein each cell includes four sides and a center. The method 400 then proceeds to step 418.

In step 414, an average value for each unified grid node with an invalid value is calculated by dividing the sum of the attribute values for the resampled attribute grid nodes from step 404 by the total number of resampled attribute grid nodes from step 404.

In step 416, the unified grid created in step 406 is converted to an OOIP grid by replacing each invalid value for a respective unified grid node with the average value calculated in step 414. The OOIP grid thus, includes an OOIP grid node at each location of a respective unified grid node representing a plurality of OOIP grid nodes, wherein each OOIP grid node has a value that is the same value as the valid value of the respective unified grid node or the average value. The OOIP grid defines a plurality of cells, wherein each cell includes four sides and a center.

In step 418, each cell of the unified grid from step 406, or each cell of the OOIP grid from step 412 or step 416, is divided into four triangles. Each of the four triangles for each cell includes a vertex at the center of the respective cell and two vertices that form one of the four sides of the respective cell. Each vertex includes an x, y, z value.

In step 420, a truncated prism having a volume is created for each set of four triangles from step 418 by connecting each vertex for a respective triangle to a plane including only the x value and the y value of the respective vertex at z=0.

In step 422, OOIP is calculated as the sum of the volumes of the truncated prisms created in step 420.

In step 424, STOOIP is calculated by dividing the OOIP calculated in step 422 by the FVF from step 402.

In step 428, RHCR is calculated by multiplying the STOOIP calculated in step 424 by the recovery factor from step 402. The spatially aware reserve estimates (RHCR) are returned to step 112 in FIG. 1.

Persistence and Restored State

Figure 5:
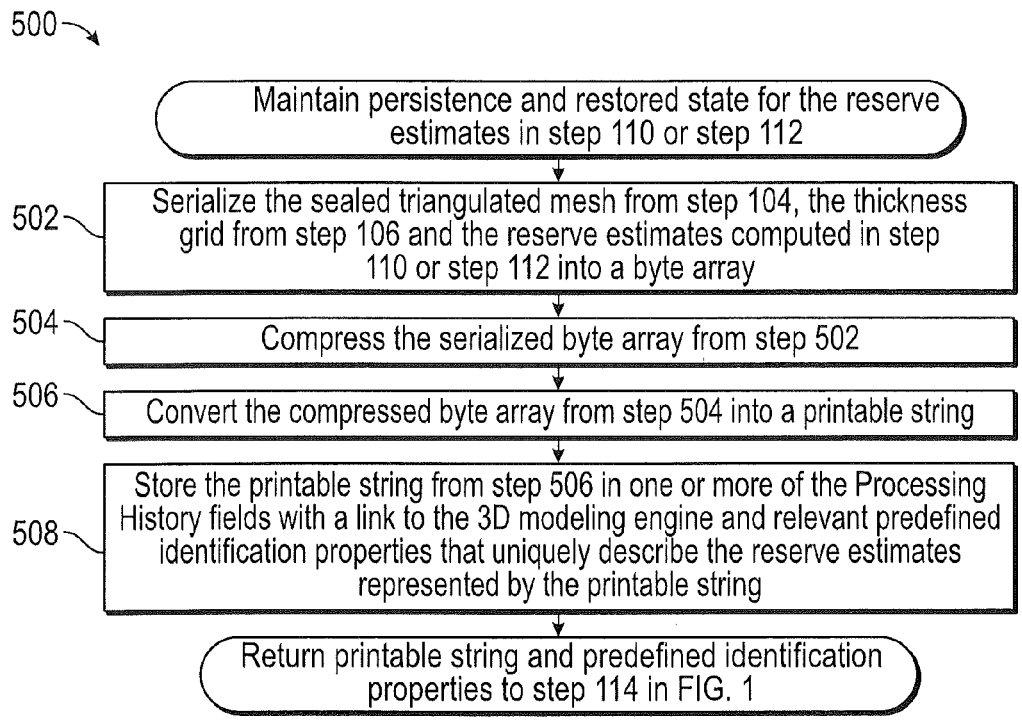
FIG. 5 is a flow diagram illustrating one embodiment of a method 500 for implementing step 114 in FIG. 1.

Referring now to FIG. 5, a flow diagram of one embodiment of a method 500 for implementing step 114 in FIG. 1 is illustrated. The method 500 maintains persistence and restored state for the reserve estimates computed in step 110 or step 112 by storing them with the sealed triangulated mesh loaded in step 104 and the thickness grid from step 106 as a printable string in one or more Processing History fields. In this manner, the reserve estimates are permanently saved with identification, interpreter, date and parameters used. Each saved result of any reserve estimate is linked to relevant predefined identification properties. By saving the sealed triangulated mesh, thickness grid and reserve estimates in the Processing History fields, the structure can be recovered, visualized again, and used as a basis for additional analysis even as the structure changes over time.

In step 502, the sealed triangulated mesh from step 104, the thickness grid from step 106 and the reserve estimates computed in step 110 or step 112 are serialized into a byte array using techniques well known in the art.

In step 504, the serialized byte array from step 502 is compressed using techniques well known in the art.

In step 506, the compressed byte array from step 504 is converted into a printable string using UTF-8/ASCII characters to make it compatible with standard Processing History fields.

Figure 7:
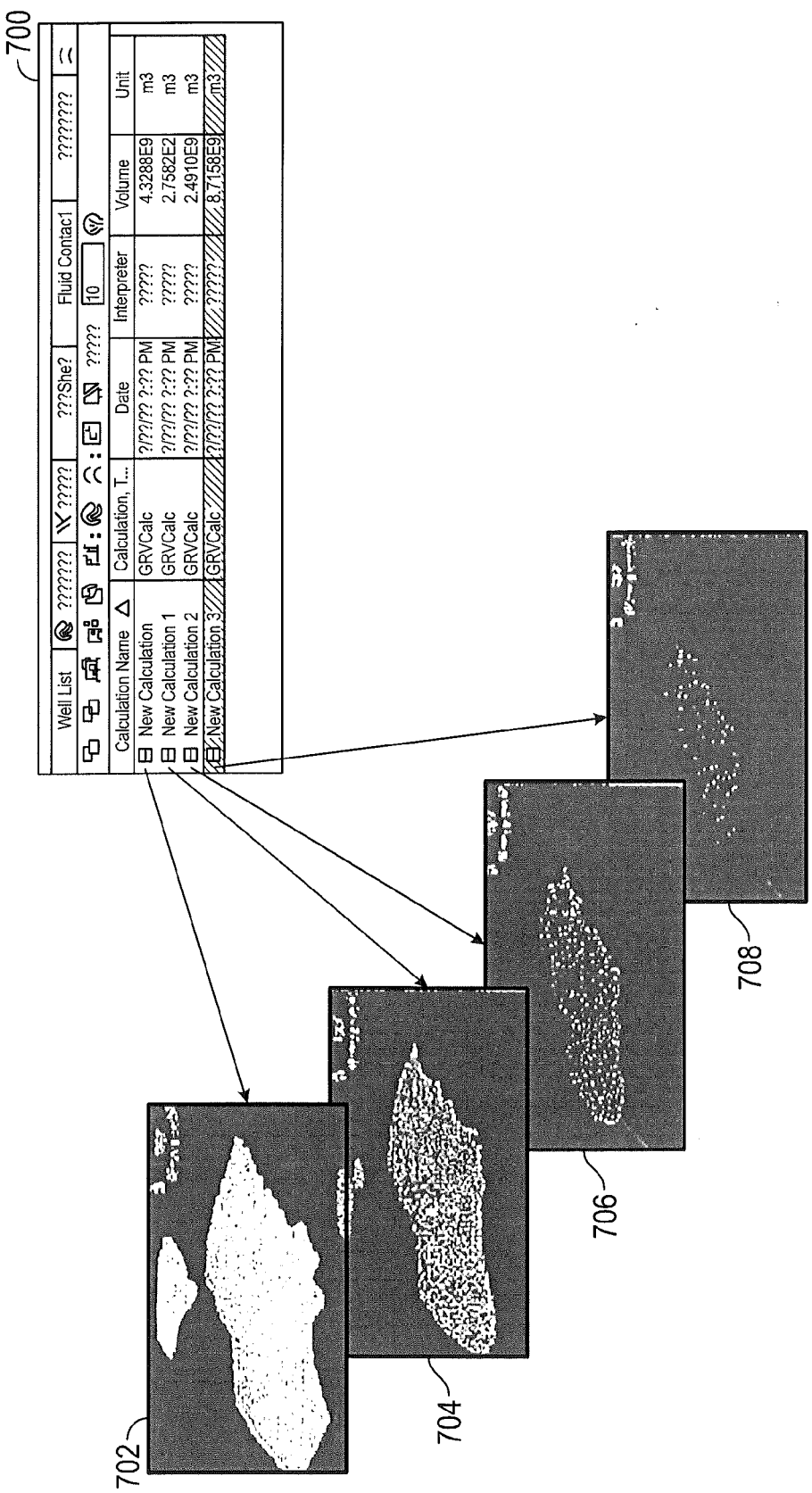
FIG. 7 is a display illustrating exemplary predefined identification properties linked to a sealed triangulated mesh that is displayed at four different time intervals using the printable string stored in step 508 of FIG. 5 and a 3D modeling engine.

In step 508, the printable string from step 506 is stored in one or more of the Processing History fields with a link to the 3D modeling engine and relevant predefined identification properties that uniquely describe the reserve estimates represented by the printable string. The printable string and predefined identification properties are returned to step 114 in FIG. 1. In FIG. 7, a display 700 illustrates exemplary predefined identification properties linked to a sealed triangulated mesh 702, 704, 706, 708 that is displayed at four different time intervals using the 3D modeling engine. In this manner, the reservoir model at a predetermined time may be dynamically compared to the reservoir model at another predetermined time to improve the reserve estimates in the reservoir model.

Display and Reporting

Figure 6:
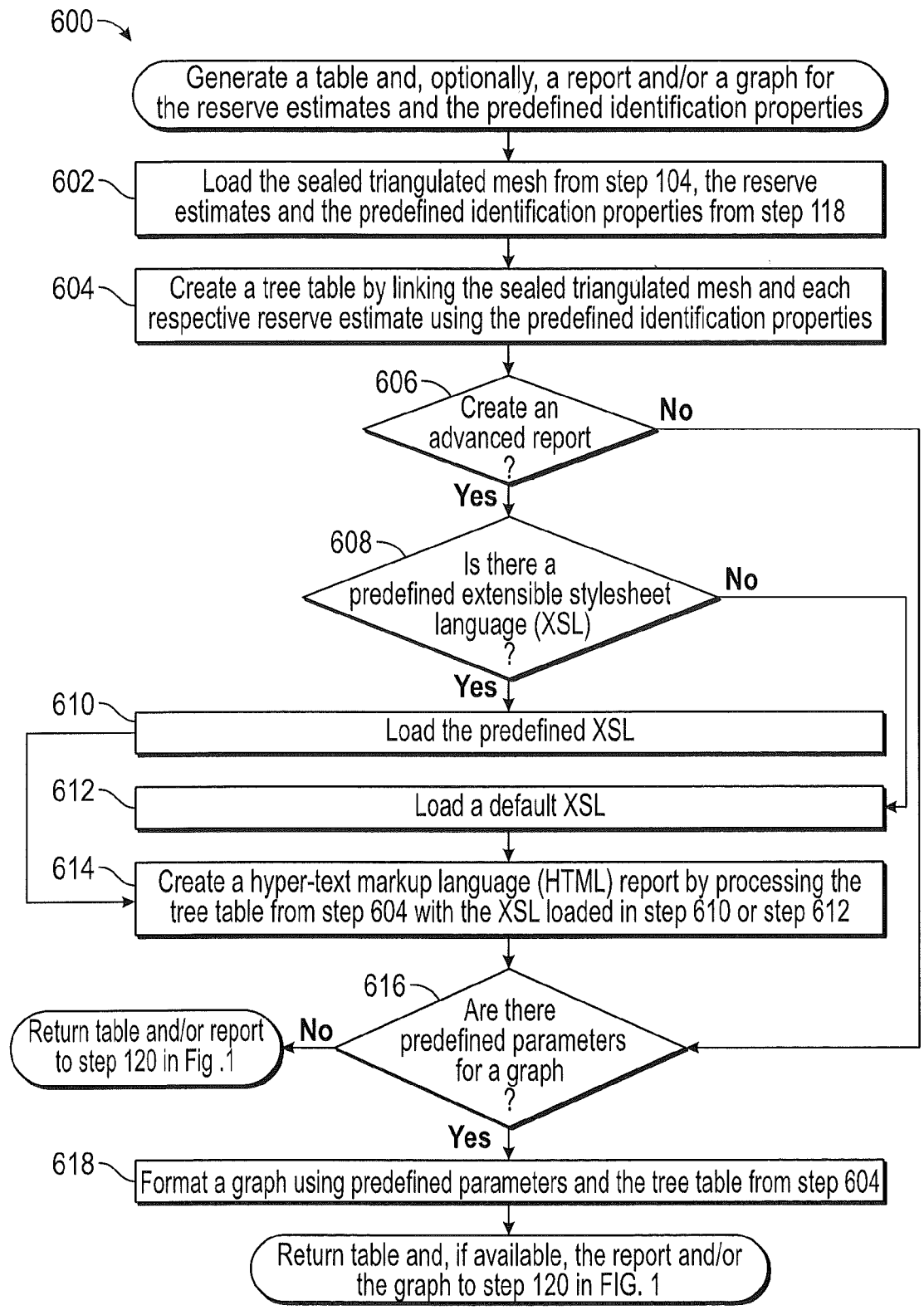
FIG. 6 is a flow diagram illustrating one embodiment of a method 600 for implementing step 120 in FIG. 1.

Referring now to FIG. 6, a flow diagram of one embodiment of a method 600 for implementing step 120 in FIG. 1 is illustrated. The method 600 generates a table and, optionally, a report and/or a graph for the reserve estimates and the predefined identification properties loaded in step 118. The report provides abstracted control over the layout and the possibility for additional custom defined layouts in the future.

In step 602, the sealed triangulated mesh from step 104, the reserve estimates and the predefined identification properties from step 118 are loaded.

In step 604, a tree table is created by linking the sealed triangulated mesh and each respective reserve estimate using the predefined identification properties. In FIG. 8, a display 800 illustrates an exemplary tree table wherein each reserve estimate is represented by the volume/units columns and includes the type of calculation, its date and the interpreter.

In step 606, the method 600 determines if an advanced report should be created using the client interface and/or the video interface described in reference to FIG. 10. If an advanced report should not be created, then the method 600 proceeds to step 616. Otherwise, the method proceeds to step 608.

In step 608, the method 600 determines if there is a predefined extensible style-sheet language (XSL) using the client interface and/or the video interface described in reference to FIG. 10. If there is not a predefined XSL, then the method 600 proceeds to step 612. Otherwise, the method 600 proceeds to step 610.

In step 610, the predefined XSL is loaded and interpreted and the method 600 then proceeds to step 614.

In step 612, a default XSL is loaded and interpreted.

In step 614, a hyper-text markup language (HTML) report is created by processing the tree table from step 604 with the XSL loaded in step 610 or step 612. In FIG. 9, a display 900 illustrates an exemplary HTML report created with the default XSL from step 612 wherein the individual parameters of each reserve estimate are shown such as the calculation name values for each parameter distinguished by each column.

In step 616, the method 600 determines if there are predefined parameters for a graph using the client interface and/or the video interface described in reference to FIG. 10. If there are no predefined parameters for a graph, then the method 600 returns the table and, if available, the report to step 120 in FIG. 1. Otherwise, the method proceeds to step 618.

In step 618, a graph is formatted using predefined parameters and the tree table from step 604. The table and, if available, the report and/or the graph are returned to step 120 in FIG. 1.

System Description

The present disclosure may be implemented through a computer-executable program of instructions, such as program modules, generally referred to as software applications or application programs executed by a computer. The software may include, for example, routines, programs, objects, components and data structures that perform particular tasks or implement particular abstract data types. The software forms an interface to allow a computer to react according to a source of input. DecisionSpace® Geosciences, which is a commercial software application marketed by Landmark Graphics Corporation, may be used as an interface application to implement the present disclosure. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g., various types of RAM or ROM). Furthermore, the software and its results may be transmitted over a variety of carrier media such as optical fiber, metallic wire and/or through any of a variety of networks, such as the Internet.

Moreover, those skilled in the art will appreciate that the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Referring now to FIG. 10, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described herein and illustrated in FIGS. 1-9. The memory therefore, includes a visual volumetrics module, which enables steps 106, 110, 112 and 120 described in reference to FIG. 1. The visual volumetrics module may integrate functionality from the remaining application programs illustrated in FIG. 10. In particular, DecisionSpace® Geosciences may be used as an interface application to perform steps 102, 108, 116 in FIG. 1 while steps 104 and 118 may be performed using the database. Although DecisionSpace® Geosciences may be used as an interface application, other interface applications may be used, instead, or the visual volumetrics module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/non-removable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method for determining reserve estimates for a reservoir, which comprises:
    resampling an attribute grid by matching the attribute grid and a thickness grid so that the attribute grid includes an attribute grid node at each location of a thickness grid node;
    creating a unified grid with a plurality of cells and a unified grid node at each location of an attribute grid node; wherein each unified grid node includes a value that is the product of a thickness value of a thickness grid node at a location of the respective unified grid node and an attribute value of a respective resampled attribute grid node at the location of the respective unified grid node;
    replacing each invalid value for a respective unified grid node with one of a constant value and an average value;
    dividing each cell of the unified grid into four triangles, wherein each of the four triangles includes a vertex at a center of the respective cell and two vertices that form one of four sides of the respective cell;
    creating a truncated prism with a volume for each set of four triangles using a computer processor;
    adding the volume of each truncated prism together, which represents an Original Oil in Place;
    dividing the Original Oil in Place by a Formation Volume Factor, which represents a Stock Tank Original Oil in Place; and
    multiplying the Stock Tank Original Oil in Place and a recovery factor, which represents Recoverable Hydrocarbon Reserves.

2. The method of claim 1, wherein the attribute value represents a value for an attribute from one of porosity, permeability, fluid saturation and net to gross ratio.

3. The method of claim 1, wherein the resampled attribute grid includes one or more attribute grid nodes with an attribute value that is null.

4. The method of claim 3, wherein the value of each unified grid node that is the product of the thickness value and a null attribute value is invalid.

5. The method of claim 1, wherein the average value is determined by dividing a sum of the attribute values for the resampled attribute grid nodes by a total number of resampled attribute grid nodes.

6. The method of claim 1, wherein the attribute grid is resampled using bicubic interpolation.

7. The method of claim 1, wherein the constant value is zero.

8. The method of claim 1, further comprising improving production from the reservoir using the Recovered Hydrocarbon Reserves.

9. The method of claim 1, wherein each truncated prism is created by connecting each vertex for a respective triangle to a plane including only an x-value and a y-value of the respective vertex at z=0.

10. A non-transitory storage device tangibly carrying computer-executable instructions for determining reserve estimates for a reservoir, the instructions being executable to implement:
    resampling an attribute grid by matching the attribute grid and a thickness grid so that the attribute grid includes an attribute grid node at each location of a thickness grid node;
    creating a unified grid with a plurality of cells and a unified grid node at each location of an attribute grid node; wherein each unified grid node includes a value that is the product of a thickness value of a thickness grid node at a location of the respective unified grid node and an attribute value of a respective resampled attribute grid node at the location of the respective unified grid node;
    replacing each invalid value for a respective unified grid node with one of a constant value and an average value;
    dividing each cell of the unified grid into four triangles, wherein each of the four triangles includes a vertex at a center of the respective cell and two vertices that form one of four sides of the respective cell;
    creating a truncated prism with a volume for each set of four triangles;
    adding the volume of each truncated prism together, which represents an Original Oil in Place;
    dividing the Original Oil in Place by a Formation Volume Factor, which represents a Stock Tank Original Oil in Place; and
    multiplying the Stock Tank Original Oil in Place and a recovery factor, which represents Recoverable Hydrocarbon Reserves.

11. The storage device of claim 10, wherein the attribute value represents a value for an attribute from one of porosity, permeability, fluid saturation and net to gross ratio.

12. The storage device of claim 10, wherein the resampled attribute grid includes one or more attribute grid nodes with an attribute value that is null.

13. The storage device of claim 12, wherein the value of each unified grid node that is the product of the thickness value and a null attribute value is invalid.

14. The storage device of claim 10, wherein the average value is determined by dividing a sum of the attribute values for the resampled attribute grid nodes by a total number of resampled attribute grid nodes.

15. The storage device of claim 10, wherein the attribute grid is resampled using bicubic interpolation.

16. The storage device of claim 10, wherein the constant value is zero.

17. The storage device of claim 10, further comprising improving production from the reservoir using the Recovered Hydrocarbon Reserves.

18. The storage device of claim 10, wherein each truncated prism is created by connecting each vertex for a respective triangle to a plane including only an x-value and a y-value of the respective vertex at z=0.

19. A non-transitory storage device tangibly carrying computer-executable instructions for determining reserve estimates for a reservoir, the instructions being executable to implement:

resampling an attribute grid by matching the attribute grid and a thickness grid so that the attribute grid includes an attribute grid node at each location of a thickness grid node;

creating a unified grid with a plurality of cells and a unified grid node at each location of an attribute grid node; wherein each unified grid node includes a value that is the product of a thickness value of a thickness grid node at a location of the respective unified grid node and an attribute value of a respective resampled attribute grid node at the location of the respective unified grid node;

replacing each invalid value for a respective unified grid node;

dividing each cell of the unified grid into four triangles, wherein each of the four triangles includes a vertex at a center of the respective cell and two vertices that form one of four sides of the respective cell;

creating a truncated prism with a volume for each set of four triangles by connecting each vertex for a respective triangle to a plane including only an x-value and a y-value of the respective vertex at $z=0$;

adding the volume of each truncated prism together, which represents an Original Oil in Place;

dividing the Original Oil in Place by a Formation Volume Factor, which represents a Stock Tank Original Oil in Place; and multiplying the Stock Tank Original Oil in Place and a recovery factor, which represents Recoverable Hydrocarbon Reserves.

20. The storage device of claim 19, further comprising improving production from the reservoir using the Recovered Hydrocarbon Reserves.

\* \* \* \* \*